(12) United States Patent
Ales

(10) Patent No.: US 12,020,717 B2
(45) Date of Patent: *Jun. 25, 2024

(54) TIME-ALIGNED ADDITIVE RECORDING

(71) Applicant: Brian Karl Ales, Hillsborough, NC (US)

(72) Inventor: Brian Karl Ales, Hillsborough, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/456,045

(22) Filed: Aug. 25, 2023

(65) Prior Publication Data

US 2024/0087581 A1    Mar. 14, 2024

Related U.S. Application Data

(63) Continuation of application No. 17/375,659, filed on Jul. 14, 2021, now Pat. No. 11,741,976.
(Continued)

(51) Int. Cl.
*G10L 19/018* (2013.01)
*G11B 20/10* (2006.01)

(52) U.S. Cl.
CPC ...... *G10L 19/018* (2013.01); *G11B 20/10527* (2013.01); *G11B 2020/10546* (2013.01)

(58) Field of Classification Search
CPC ............ G10L 19/018; G11B 20/10527; G11B 2020/10546
See application file for complete search history.

(56) References Cited

U.S. PATENT DOCUMENTS 9,305,559 B2    4/2016    Sharma et al.
9,401,153 B2    7/2016    Sharma et al.
(Continued)

FOREIGN PATENT DOCUMENTS

WO    2014204459 A1    12/2014
WO    2022182517 A1    9/2022

OTHER PUBLICATIONS

"EVERCAST," Real Time Creative Collaboration, https://web.archive.org/web/20180809015237/https://www.evercast.us/, Aug. 9, 2018, 5 pages.
(Continued)

*Primary Examiner* — Bryan S Blankenagel
(74) *Attorney, Agent, or Firm* — Bass Patent Law, LLC

(57) ABSTRACT

The present teachings generally include time-aligned additive recordings, e.g., for remote music production, dialog post-production, and the like. In this manner, the present teachings can provide a substantially real-time, collaborative experience between two or more remote users—e.g., producer and collaborator(s). Specifically, through the use of audio 'watermarks' (as discrete signals or embedded within data corresponding to first audio content such as recorded music or film/video audio) that can be sent to a collaborator, replicated in a time-aligned manner, and returned (as discreet signals or embedded within data corresponding to second audio content such as musical or dialog content), an additive multitrack audio recording can be created with precise time-alignment maintained during monitoring of the recording itself and in the resulting second audio, thus effectively emulating an in-person audio production session. The present teachings can also enable the development of supplemental services such as collaborator networks and/or marketplaces.

20 Claims, 5 Drawing Sheets

Related U.S. Application Data

(60) Provisional application No. 63/152,891, filed on Feb. 24, 2021.

(56) References Cited

U.S. PATENT DOCUMENTS

| | | | |
|---|---|---|---|
| 9,412,390 B1 | 8/2016 | Chaudhary | |
| 2012/0163558 A1 | 6/2012 | Michaelis | |
| 2012/0203364 A1 | 8/2012 | Redmann | |
| 2013/0151855 A1 | 6/2013 | Petrovic et al. | |
| 2014/0073236 A1 | 3/2014 | Iyer | |
| 2014/0108020 A1 | 4/2014 | Sharma et al. | |
| 2015/0016661 A1 | 1/2015 | Lord | |
| 2015/0256598 A1 | 9/2015 | Walker et al. | |
| 2017/0111680 A1 | 4/2017 | Schneider et al. | |
| 2017/0263258 A1* | 9/2017 | Reitz | G11B 27/3045 |
| 2021/0409471 A1 | 12/2021 | Winsor et al. | |
| 2022/0270621 A1 | 8/2022 | Ales | |

OTHER PUBLICATIONS

"ISA/US," PCT Application No. PCT/US22/15768, International Search Report and Written Opinion dated Aug. 10, 2022, 12 pages.

"SOHONET," Clearview flex, Stream in real-time from anywhere, https://web.archive.org/web/20210122134646/https://www.sohonet.com/solutions/real-time-collaboration/clearviewflex/, Jan. 12, 2021, 13 pages.

Audiomovers, "New Listento Application, DAWless high quality audio streaming," https://audiomovers.com/, 3 pages.

JAMMR, "The Best Way to Jam Together Online," https://jammr.net/, 2021, 2 pages,.

SONOBUS, "High Quality Network Audio Streaming," https://sonobus.net/, 2021, 6 pages.

Source Elements, "Be Apart, Create Together," https://source-elements.com/, copyright 2005-2021, 12 pages,.

USPTO, U.S. Appl. No. 17/375,659, Non-Final Office Action dated Nov. 1, 2022, 18 pages.

USPTO, "U.S. Appl. No. 17/375,659, Notice of Allowance dated May 31, 2023," 13 pages.

USPTO, "U.S. Appl. No. 17/375,659, Final Office Action dated Feb. 7, 2023," 22 pages.

WIPO,"PCT Application No. PCT/US22/15768," International Preliminary Report on Patentability dated Sep. 7, 2023, 11 pages.

* cited by examiner

TIME-ALIGNED ADDITIVE RECORDING

CROSS-REFERENCE TO RELATED APPLICATIONS

This application is a continuation of U.S. patent application Ser. No. 17/375,659 filed on Jul. 14, 2021 (now U.S. Pat. No. 11,741,976), which claims priority to U.S. Provisional Application No. 63/152,891 filed on Feb. 24, 2021, the entire content of which is hereby incorporated by reference.

FIELD

The present disclosure generally relates to systems and techniques for time-aligned additive recording, e.g., to facilitate remote overdub recording that accounts for network latency and the like.

BACKGROUND

In a musical context, the process of performing and recording audio over existing accompanying audio content is known as "overdubbing." While a typical collaborative, in-person, real-time overdubbing experience allows for an interactive give-and-take that the creative process thrives upon, the practice of remote overdubbing has instead relied upon an iterative, non-collaborative, non-real-time handing back-and-forth of audio files. This can be due to the rhythmic nature of music itself and to the unfortunate existence of network latency (as one skilled in the art will appreciate, delays of even a fraction of a second between individual elements within a musical performance or a recording are unacceptable). In an audio post-production for film/video context, the process of performing and recording audio over existing accompanying audio content (e.g., dialog content) is known as "additional dialog recording" (ADR). In either case, and in similar scenarios/contexts, there remains a need for improved additive recording solutions.

SUMMARY

The present teachings generally include time-aligned additive recordings, e.g., for remote music production, dialog post-production, and the like. In this manner, the present teachings can provide a substantially real-time, collaborative experience between two or more remote users—e.g., producer and collaborator(s). Specifically, through the use of audio 'watermarks' (as discrete signals or embedded within data corresponding to first audio content such as recorded music or film/video audio) that can be sent to a collaborator, replicated in a time-aligned manner, and returned (as discreet signals or embedded within data corresponding to second audio content such as musical or dialog content), an additive multitrack audio recording can be created with precise time-alignment maintained during monitoring of the recording itself and in the resulting second audio, thus effectively emulating an in-person audio production session. The present teachings can also enable the development of supplemental services such as collaborator networks and/or marketplaces.

In an aspect, a method for time-aligned additive recording disclosed herein may include: providing control over first audio content at a digital audio workstation of a first user; establishing a connection, over a data network, between the digital audio workstation of the first user and a computing device of a second user; inserting one or more first watermarks within first data configured for transmission from the digital audio workstation of the first user to the computing device of the second user, the first data corresponding to the first audio content; saving a temporal location of each of the one or more first watermarks; transmitting the first data corresponding to the first audio content, with the one or more first watermarks, to the computing device of the second user; detecting the one or more first watermarks at the computing device of the second user and replicating one or more time-aligned watermarks in second audio content from the second user; receiving the second audio content at the digital audio workstation of the first user with the one or more time-aligned watermarks; and aligning the one or more time-aligned watermarks in the second audio content with the one or more first watermarks corresponding to the first audio content resulting in a time-aligned additive recording including both the first audio content and the second audio content.

Implementations may include one or more of the following features. The method may further include testing latency between the digital audio workstation of the first user and the computing device of the second user to determine a worst-case latency. One of (i) the worst-case latency and (ii) a largest time difference between a first watermark and a corresponding time-aligned watermark may be inserted at the digital audio workstation to facilitate time-aligned monitoring of the first audio content and the second audio content during the additive recording. After the time-aligned monitoring, the inserted delay may be disabled or removed after the additive recording. The method may further include inserting a latency compensation delay into the first audio content to account for the worst-case latency. The latency compensation delay may be inserted at the digital audio workstation of the first user to facilitate time-aligned monitoring of the first audio content and the second audio content during the additive recording. After the time-aligned monitoring, the latency compensation delay may be disabled or removed from the first audio content after the additive recording. Testing latency may automatically be conducted when the first user and the second user share an active connection. Testing latency may be conducted when not actively conducting an additive recording session so that the worst-case latency is current. The method may further include, when a current worst-case latency is greater than a previous worst-case latency, adding additional overhead latency compensation delay at a start of a subsequent additive recording session to mitigate network-related audio delivery issues experienced during the session. Testing latency may be conducted continuously. Testing latency may be conducted on a periodic basis. The method may further include saving a history of data from testing latency. Testing latency may be paused during one or more additive recording sessions. The method may further include detecting a network-related delivery error using data derived from testing latency. Local playback of the first audio content at the digital audio workstation of the first user may be initiated earlier in time relative to a temporal position of the first audio content as transmitted to the second user to facilitate time-aligned monitoring of the first audio content by the first user relative to the second user. Aligning the one or more time-aligned watermarks in the second audio content with the one or more first watermarks may include adding a delay greater than or equal to a largest time difference between one of the one or more first watermarks and a corresponding one of the one or more time-aligned watermarks. The delay may be temporarily added via the digital audio workstation of the first user to facilitate time-aligned monitoring of the first audio content and the second audio content during recording. The added delay may be disabled or removed after monitoring the time-aligned additive recording. After monitoring the time-aligned additive recording, the second audio content may be moved earlier in a timeline of the digital audio workstation of the first user to permanently align watermarks within the second audio content with saved temporal locations of the one or more first watermarks corresponding to first audio content disposed on the digital audio workstation. At least one of the one or more first watermarks may correspond to a start of the first audio content. At least one of the one or more first watermarks may be placed adjacent to the start of the first audio content. At least one of the one or more first watermarks may correspond to a start position for the second audio content. The temporal location of at least one of the one or more first watermarks may correspond to one or more of (i) a timeline of the digital audio workstation and (ii) a time of day. The method may further include inserting one or more second watermarks corresponding to an end of an additive recording, and storing a temporal location of each of the one or more second watermarks. The method may further include inserting one or more third watermarks during the additive recording, and storing a temporal location of each of the one or more third watermarks. At least one of the one or more second watermarks and the one or more third watermarks may be inserted when a predetermined condition is met, the predetermined condition including at least one of (i) detection of an unstable network connection and (ii) the additive recording having a duration above a predetermined threshold. A watermark of the one or more first watermarks may be audible to a human. A watermark of the one or more first watermarks may be inaudible to a human. The method may further include detecting a network-related delivery error using one or more of the first watermarks and the time-aligned watermarks. The method may further include removing at least one of the one or more time-aligned watermarks and the one or more first watermarks from the time-aligned additive recording that is saved on the digital audio workstation. Removal of watermarks may be conducted via digital audio signal processing (DSP). The method may further include playing the time-aligned additive recording on the digital audio workstation. The method may further include saving the time-aligned additive recording on the digital audio workstation. The method may further include receiving first audio content in the digital audio workstation for use by the first user. The method may further include creating an additive recording session including one or more predefined audio formats at the digital audio workstation. The method may further include transferring information from a musical instrument digital interface through the connection between the digital audio workstation and the computing device. Control over the first audio content includes functionality may include one or more of play, stop, seek, and record.

In an aspect, a computer program product disclosed herein may include computer executable code embodied in a non-transitory computer readable medium that, when executing on one or more computing devices, performs the steps of: providing control over first audio content at a digital audio workstation of a first user; establishing a connection, over a data network, between the digital audio workstation of the first user and a computing device of a second user; inserting one or more first watermarks within first data configured for transmission from the digital audio workstation of the first user to the computing device of the second user, the first data corresponding to the first audio content; saving a temporal location of each of the one or more first watermarks; transmitting the first data corresponding to the first audio content, with the one or more first watermarks, to the computing device of the second user; detecting the one or more first watermarks at the computing device of the second user and replicating one or more time-aligned watermarks in second audio content from the second user; receiving the second audio content at the digital audio workstation of the first user with the one or more time-aligned watermarks; and aligning the one or more time-aligned watermarks in the second audio content with the one or more first watermarks corresponding to the first audio content resulting in a time-aligned additive recording including both the first audio content and the second audio content.

In an aspect, a system disclosed herein may include: a first computing device associated with a first user, the first computing device including, or otherwise in communication with, a digital audio workstation providing control over first audio content; a second computing device associated with a second user, the second computing device including, or otherwise in communication with, a collaborator application; a data network interconnecting the first computing device and the second computing device; a processor; and a memory. The memory may store computer executable code embodied in a non-transitory computer readable medium that, when executed, causes the processor to perform the steps of: inserting one or more first watermarks within first data configured for transmission from the first computing device to the second computing device, the first data corresponding to the first audio content; saving a temporal location of each of the one or more first watermarks; transmitting the first data corresponding to the first audio content, with the one or more first watermarks, to the second computing device; detecting the one or more first watermarks at the second computing device and replicating one or more time-aligned watermarks in second audio content; receiving the second audio content at the first computing device with the one or more time-aligned watermarks; and aligning the one or more time-aligned watermarks in the second audio content with the one or more first watermarks corresponding to the first audio content resulting in a time-aligned additive recording including both the first audio content and the second audio content.

Implementations may include one or more of the following features. One or more of the digital audio workstation and the collaborator application may be wholly or partially run from a remote computing resource. The remote computing resource may include a web server. The system may further include a database accessible to one or more of the first user and the second user over the data network. The database may store a participant network for the system. The database may store audio content for use by the system. One or more of the memory and the database may include a history of data from testing latency. One or more of the processor and the memory may be disposed on at least one of the first computing device, the second computing device, and a remote computing resource in communication with one or more of the first computing device and the second computing device over the data network. The computer executable code may further cause the processor to test latency over the data network between the first computing device and the second computing device, and to determine a worst-case latency. The greater of (i) the worst-case latency and (ii) a largest time difference between a first watermark and a corresponding time-aligned watermark may be inserted at the digital audio workstation to facilitate time-aligned monitoring of the first audio content and the second audio content. The computer executable code may further cause the processor to insert a latency compensation delay into the first audio content to account for the worst-case latency.

These and other features, aspects, and advantages of the present teachings will become better understood with reference to the following description, examples, and appended claims.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein. In the drawings, like reference numerals generally identify corresponding elements.

DETAILED DESCRIPTION

Figure 1:
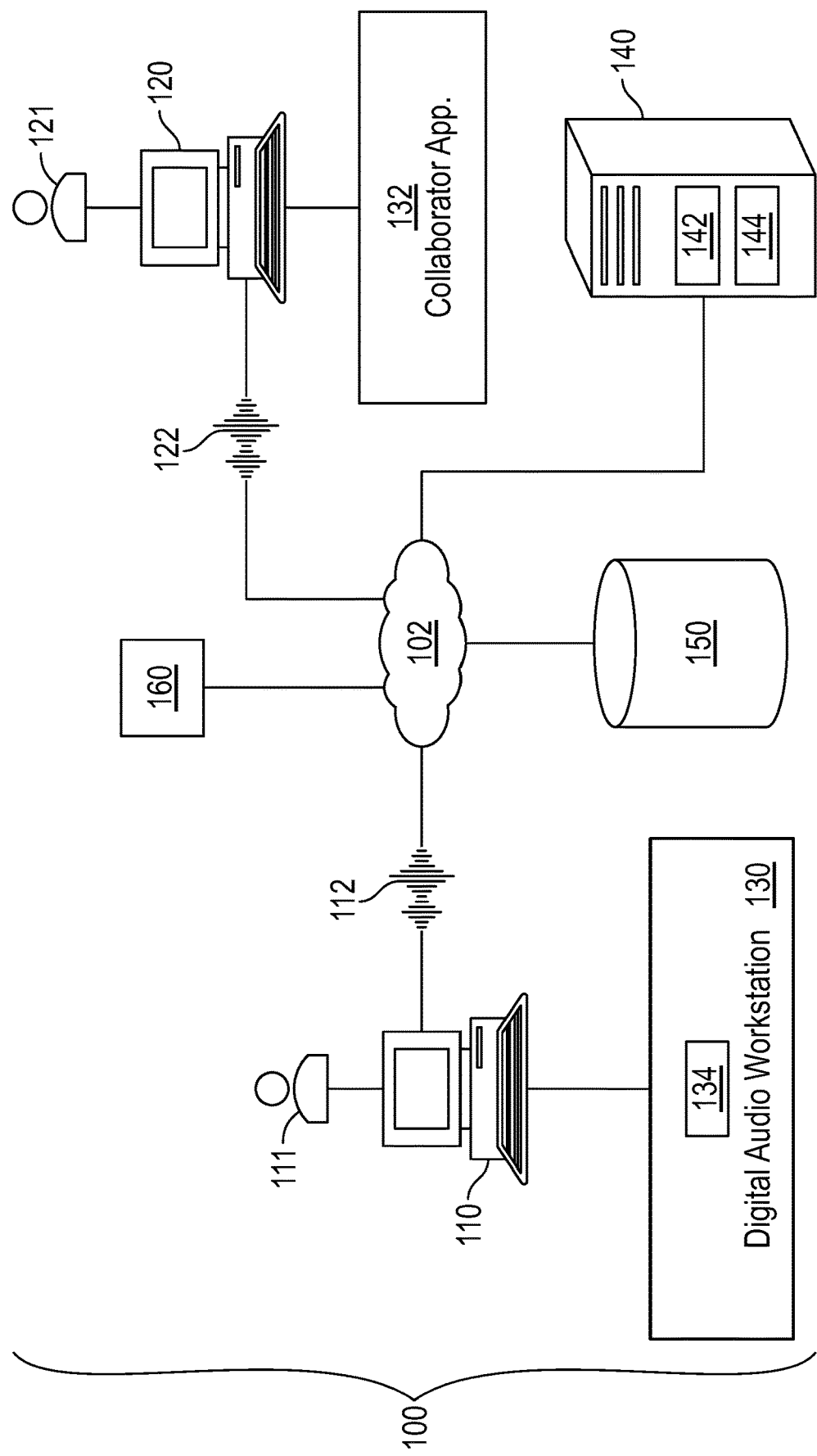
FIG. 1 illustrates a system for time-aligned additive recording, in accordance with a representative embodiment.

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "about," "approximately," or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms unless specifically stated to the contrary.

In general, the devices, systems, and methods disclosed herein relate to time-aligned additive recording. For example, the present teachings can be used for remote overdubbing via a connection over a data network such as the internet, where aspects of the present teachings account for inherent latency in such network connections such that remote overdubbing sessions can include time-aligned additive recordings (commonly referred to as "takes" in the music/entertainment industry) that sound as intended. That is, if first audio content (e.g., background music) and second audio content (e.g., collaborator overdub content) are not properly time-aligned in an intended manner, the combination of the first audio content the second audio content may sound vastly different from the intended combined audio. For example, even if the first audio content the second audio content are misaligned by mere milliseconds (e.g., 25 milliseconds), the resulting combination could sound 'off' from what is intended. Thus, time alignment of overdub recordings (e.g., time alignment for the monitoring of overdub content creation) in a remote session can be critical to perceiving overdub audio as intended.

The present teachings can thus provide a technique for remote collaborations of audio content that can account for latency (network or otherwise) in a streamlined and user-transparent manner that does not interrupt or obstruct the creative process. In other words, the present teachings can provide functionality that can occur without disruption for users who are completely unaware that audio content is being time aligned, resulting in a comprehensive and seamless emulation of an in-person audio production session over a data network such as the internet. A description of some of the advantages and features of the present teachings are included below.

Through the use of watermarks during latency testing and/or inserted into audio content during additive recordings and similar (and/or data associated with audio content, such as data packets or the like included in a real-time transport protocol (RTP), transmission control protocol, or another network protocol procedure for delivering audio and/or video content over data networks), the present teachings may provide millisecond-accurate latency reconciliation. That is, while internet latency is often measured and managed in seconds, this is generally a uselessly long period of time for musical or other similar purposes. Therefore, the alignment of remotely created audio content relative to local accompanying audio content may be accomplished via watermarks or the like that are embedded in the actual audio itself (and/or data associated therewith). These watermarks may be well-suited mechanisms because they can be defined and managed in at least two ways: (i) by the relatively precise location relative to a digital audio workstation timeline or the like, and (ii) by the relatively precise operating system (OS) level real time of their insertion relative to the time of reception of a corresponding watermark. This combination may allow for a relatively precise time-aligned monitoring of overdub content both during a recording itself (e.g., a 'take') and equally precise time-aligned placement of the overdub recording for further production after the recording ('take').

The present teachings may also include multiple levels of iterative latency testing involving 'standalone' watermark roundtrip measurement (e.g., between a producer and a collaborator over a data network) between 'takes.' That is, latency may be tested that accounts for one or more of network latency, and/or computational latency (e.g., roundtrip computational latency) and the like—i.e., latency that occurs when performing one or more of the tasks/steps of the present teachings and/or a networked system or the like upon which the present teachings is run. Further, to help ensure both intact data transfer and ease of use, the system may not test latency only once, but rather multiple times sequentially in the background, e.g., while the system is at rest between 'takes." This is intended to measure the stability of the data connection: while typically "jitter" is defined as latency variability between individual TCP/IP packets independently traversing a network, multiple repeated tests over time can be thought of as a measure of the "jitter of the jitter." The results of such testing may be stored in a per-session memory, a database, or the like. This approach may enable both a more-timely measurement as close to the start of each individual 'take' as possible, and a richer sense of latency stability over a certain timeframe.

The present teachings may be implemented to run in the background on a computing device (such as on an application running on the computing device, and/or hosted remotely for use on the computing device) without human interaction in any manner that adversely affects the creative process of overdubbing and the like. That is, an implementation of the present teachings may be included as a native feature of a user's (e.g., a producer's) digital audio workstation (DAW) itself. Compared to existing 'bolt-on' remote recording solutions, this tight integration within a DAW may allow tasks—e.g., complex and error-prone tasks that would otherwise be performed manually—such as audio routing, monitoring switching, latency detection, and/or latency reconciliation to be carried out automatically in the background in a manner that can be transparent to a user (e.g., when a user is unaware these tasks are being performed, and/or where the user is unimpeded by the performance of these tasks).

While a preferred use-case for an aspect of the present teachings includes the process for creation of overdub audio in the form of music or the like, other use-cases are also or instead possible as will be understood by a skilled artisan. That is, aspects of the present teachings can be used in nearly any scenario. Such scenarios may include live streaming of music content that includes contributions from multiple remote musicians in which both the performer(s) and the end listener(s) experience a completely time-aligned combinative musical result. Additionally, the present teachings can be used in non-musical scenarios such as, but not limited to, audio post-production for film/video, e.g., in which existing recorded dialog (e.g., on-set dialogue) must often be replaced and/or repaired (a process known as additional dialog recording or "ADR") or in remote audio/radio/podcast production (and the like), thereby potentially eliminating the need for manual post-recording "tape sync" (also known as "phone sync" or "double-end") processes. Thus, it will be understood that, when aspects of the present teachings are described as being used for the creation of overdub audio in the form of music or the like, these same or similar aspects of the present teachings may also or instead be used in other contexts without departing from the scope of this disclosure. And thus, an output of the present teachings may include a time-aligned additive recording, which may simply include two or more different audio recording components (as intended by one or more users). Such additive recordings will thus be understood to include multitrack audio recordings.

Some definitions that may be helpful for understanding the present teachings are now provided. A "producer" may include a musical producer, audio producer, recording engineer, and the like. The producer may manage a content creation session (e.g., overdub recording session) using their local digital audio workstation (DAW). Examples of a DAW include Apple Logic Pro, Apple Garage Band, Protools, Ableton Live, Cubase, and so on. A "collaborator" may include one that adds content, e.g., an "overdubbing" musician. In the context of aspects of the present teachings, a producer and a collaborator may be remote to one another, where "remote" can include a traditional definition where the parties are disposed in different geographic locations and/or where the parties are simply using different computing devices (e.g., "remote" can be location agnostic, but rather based on the use of different computing devices communicating over a network such as the internet and/or a local network). "Latency compensation delay" may include a delay that is measured at the start of an additive recording session or take. "Monitor delay," which may also be referred to herein as "in-take producer-local content monitor delay" (IPCMD), may refer to the sum of any latency compensation delay and any pre-take computational task time applied as temporary compensatory delay. "Post-take additive content alignment amount" (PACAA) may refer to the amount of compensatory time-shifting applied to the second audio content at the conclusion of a recording to achieve a fully synchronized additive recording. A "local basic track" may include audio content used by a producer, which can be disposed on the producer's local DAW that may be sent to collaborator(s) as (e.g., stereo or multitrack) sub-mix audio and/or as discrete multitrack audio. A "mirrored session" may refer to an additive recording session in which a collaborator may make use of a compatible DAW and thus may have, for example, individual track-level volume control over shared discrete local foundational producer-local audio content (such as "basic tracks" as one skilled in music production will appreciate) rather than over a single producer-created monitor sub-mix.

FIG. 1 illustrates a system for time-aligned additive recording, in accordance with a representative embodiment. In general, the system 100 may be used for implementing one or more of the techniques described herein for time-aligned additive recording. The system 100 may include a networked environment where a data network 102 interconnects a plurality of participating devices and/or users in a communicating relationship. The participating devices may, for example, include any number of user devices (e.g., a first computing device 110 associated with a first user 111 and a second computing device 120 associated with a second user 121), remote computing resources 140, databases 150, and other resources 160.

In certain aspects, the system 100 may utilize a "peer-to-peer" connection over the data network 102, whereby relatively high-quality (e.g., high bitrate and/or lossless compressed, or uncompressed) audio is transferred from a producer (e.g., the first user 111) to a collaborator (e.g., the second user 121) and then back again to the producer in a musically-precise, latency-compensated manner (note that if present, musical instrument digital interface (MIDI) information may also be transferred). As discussed above, and as explained in more detail elsewhere herein, the system 100 may include latency compensation to facilitate time-aligned additive recording over the data network 102. In certain aspects, there are at least two situations during which latency compensation can be advantageously applied: (i) temporarily during monitoring of the creation of overdub content, where the producer/recording engineer could be able to monitor/audition the overdub audio in near-perfect synchronization relative to a local basic track during the recording, and (ii) after the additive recording is created, latency compensation could be used for recorded overdub content to be permanently synchronized relative to the local basic track.

Turning back to the participants in the system 100, the data network 102 may be any network(s) or internetwork(s) suitable for communicating data and information among participants in the system 100. This may include public networks such as the internet, private networks, telecommunications networks such as the Public Switched Telephone Network or cellular networks using third generation (e.g., 3G or IMT-2000), fourth generation (e.g., LTE (E-UTRA) or WiMAX-Advanced (IEEE 802.16m)), fifth generation (e.g., 5G), and/or other technologies, as well as any of a variety of corporate area or local area networks and other switches, routers, hubs, gateways, and the like that might be used to carry data among participants in the system 100.

Each of the participants of the data network 102 may include a suitable network interface comprising, e.g., a network interface card, which term is used broadly herein to include any hardware (along with software, firmware, or the like to control operation of same) suitable for establishing and maintaining wired and/or wireless communications. The network interface card may include without limitation a wired Ethernet network interface card ("NIC"), a wireless 802.11 networking card, a wireless 802.11 USB device, or other hardware for wired or wireless local area networking. The network interface may also or instead include cellular network hardware, wide area wireless network hardware or any other hardware for centralized, ad hoc, peer-to-peer, or other radio communications that might be used to connect to a network and carry data. In another aspect, the network interface may include a serial or USB port to directly connect to a local computing device such as a desktop computer that, in turn, provides more general network connectivity to the data network 102.

In general, the user devices (e.g., the first computing device 110 and the second computing device 120) may include any devices within the system 100 operated by one or more users (e.g., the first user 111 and the second user 121) for practicing the techniques as contemplated herein. Specifically, the user devices may include any device for creating, preparing, editing, receiving, and/or transmitting (e.g., over the data network 102) content such as audio (e.g., music), video, and so on. The user devices may also or instead include any device for managing, monitoring, or otherwise interacting with tools, platforms, and devices included in the systems and techniques contemplated herein.

The user devices may be coupled to the data network 102, e.g., for interaction with one or more other participants in the system 100.

By way of example, one or more of the user devices may include one or more desktop computers, laptop computers, network computers, tablets, mobile devices, portable digital assistants, messaging devices, cellular phones, smart phones, portable media or entertainment devices, or any other computing devices that can participate in the system 100 as contemplated herein. As discussed above, the user devices may include any form of mobile device, such as any wireless, battery-powered device, that might be used to interact with the networked system 100. It will also be appreciated that one of the user devices may coordinate related functions (e.g., insertion of a watermark or the like, testing for latency, applying latency compensation, recording audio and/or video, storing recordings, and so on) as they are performed by another entity such as one of the remote computing resources 140 or other resources 160.

Each user device may generally provide a user interface, such as any of the user interfaces described herein. The user interface may be maintained by a locally executing application on one of the user devices that receives data from, e.g., the remote computing resources 140 or other resources 160. In other embodiments, the user interface may be remotely served and presented on one of the user devices, such as where a remote computing resource 140 or other resource 160 includes a web server that provides information through one or more web pages or the like that can be displayed within a web browser or similar client executing on one of the user devices. The user interface may in general create a suitable visual and/or audio presentation for user interaction on a display device of one of the user devices, and provide for receiving any suitable form of user input including, e.g., input from a musical instrument, an audio mixer, a recording device, a keyboard, a mouse, a touchpad, a touch screen, a hand gesture, or other use input device(s).

The remote computing resources 140 may include, or otherwise be in communication with, a processor 142 and a memory 144, where the memory 144 stores code executable by the processor 142 to perform various techniques of the present teachings. More specifically, a remote computing resource 140 may be coupled to the data network 102 and accessible to a user device through the data network 102, where the remote computing resource 140 includes a processor 142 and a memory 144, where the memory 144 stores code executable by the processor 142 to perform the steps of a method according to the present teachings. It will be understood that the processor 142, and the memory 144 that stores code executable by the processor 142 to perform the steps of a method according to the present teachings, may also or instead be included on, or in communication with, one or more of the other participants in the system 100 such as one or more of the user devices. It will be further be understood that some or all of the functionality for time-aligned additive recording according to the present teachings may be performed using a digital audio workstation (DAW) 130, which may be an application wholly or partially run from a remote computing resource 140 and/or another component of the system 100. Also or instead, the DAW 130 may be wholly disposed locally on a user device (e.g., the first computing device 110).

The remote computing resources 140 may also or instead include data storage, a network interface, and/or other processing circuitry. In the following description, where the functions or configuration of a remote computing resource 140 are described, this is intended to include corresponding functions or configuration (e.g., by programming) of a processor 142 of the remote computing resource 140, or in communication with the remote computing resource 140. In general, the remote computing resources 140 (or processors 142 thereof or in communication therewith) may perform a variety of processing tasks related to time-aligned additive recording as described herein. The remote computing resources 140 may also or instead include backend algorithms that react to actions performed by a user at one or more of the user devices. The backend algorithms may also or instead be located elsewhere in the system 100.

The remote computing resources 140 may also or instead include a web server or similar front end that facilitates web-based access by the user devices to the capabilities of the remote computing resource 140 or other components of the system 100. A remote computing resource 140 may also or instead communicate with other resources 160 in order to obtain information for providing to a user through a user interface on a user device. Where a user specifies certain criteria for time-aligned additive recording, this information may be used by a remote computing resource 140 (and any associated algorithms) to access other resources 160. Additional processing may be usefully performed in this context such as recommending certain processing operations and techniques.

A remote computing resource 140 may also or instead be configured to manage access to certain content. In one aspect, a remote computing resource 140 may manage access to a component of the system 100 by a user device according to input from a user.

The database 150 may include any as known in the art, and can be a remotely situated database (e.g., cloud storage) and/or a local database or memory. The database 150 may provide storage for content used in the system 100 and/or content created within the system 100. For example, the database 150 may include a plurality of audio content for use in the system 100.

The other resources 160 may include any resources that may be usefully employed in the devices, systems, and methods as described herein. For example, the other resources 160 may include without limitation other data networks, musical instruments or other music/audio creation devices, imaging tools, cameras, human actors (e.g., content creators such as musicians), sensors (e.g., audio or visual sensors), data mining tools, computational tools, data monitoring tools, and so forth. The other resources 160 may also or instead include any other software or hardware resources that may be usefully employed in the networked applications as contemplated herein. For example, the other resources 160 may include payment processing servers or platforms used to authorize payment for access, content or feature purchases, or otherwise. In another aspect, the other resources 160 may include certificate servers or other security resources for third-party verification of identity, encryption or decryption of data, and so forth. In another aspect, the other resources 160 may include a desktop computer or the like co-located (e.g., on the same local area network with, or directly coupled to through a serial or USB cable) with one of the user devices or remote computing resources 140. In this case, the other resource 160 may provide supplemental functions for a user device and/or remote computing resource 140. Other resources 160 may also or instead include supplemental resources such as scanners, cameras, printers, input devices, and so forth.

The other resources 160 may also or instead include one or more web servers that provide web-based access to and from any of the other participants in the system 100. While depicted as a separate network entity, it will be readily appreciated that the other resources 160 (e.g., a web server) may also or instead be logically and/or physically associated with one of the other devices described herein, and may, for example, include or provide a user interface for web access to a remote computing resource 140 or a database 150 in a manner that permits user interaction through the data network 102, e.g., from a user device.

It will be understood that the participants in the system 100 may include any hardware or software to perform various functions as described herein. For example, one or more of the user devices and the other resources 160 may include a memory 144 and a processor 142.

One or more of the components of the system 100 may include, or otherwise be in communication with, one or more of a DAW 130 and a collaborator application 132. In certain embodiments, DAW 130 and/or the collaborator application 132 provide functionality for users of the system 100 for time-aligned additive recording. That is, in general, a first user 111 such as a producer may have access to, and/or control over, a DAW 130; and in general, a second user 121 such as a collaborator may have access to, and/or control over, a collaborator application 132. It will be understood that one or more of the DAW 130 and the collaborator application 132 may be disposed on a user device (e.g., one or more of the first computing device 110 and the second computing device 120), a remote computing resource 140 such as a web server providing web-based access to some or all of the functionality of one or more of the DAW 130 and the collaborator application 132, another component of the system 100, or a combination thereof (e.g., where some functionality or features of one or more of the DAW 130 and the collaborator application 132 is stored and/or run locally on a user device, and other functionality or features are stored and/or run remotely from a user device). In certain aspects, and as described in more detail below, the DAW 130 may include a robust application while the collaborator application 132 may be more of a lightweight application. However, in other aspects, the collaborator application 132 may include all of the features and functionality of the DAW 130. Moreover, in certain aspects, the collaborator application 132 may be part of the DAW 130.

Thus, in certain implementations, and for maximum ease of use, at least some of the functionality of the system 100 may be provided to a user (e.g., a producer) as a tightly-integrated DAW 130 (or a feature thereof), and at least some of the functionality of the system 100 may be provided to a user (e.g., a collaborator remote to the producer) as a collaborator application 132, which may include a lighter-weight standalone application and/or a tightly-integrated feature on a compatible DAW 130. Additionally, a cloud-based centralized server may be used.

As discussed above, the first user 111 (e.g., a producer) may have access to the DAW 130, which can include an application with executable code that performs some or all of the steps of a technique according to the present teachings. And, in certain aspects, the producer may invoke functionality of the present teachings simply by inserting an additional channel (or 'track') into a session on the DAW 130. To those skilled in the art, this can be a completely fundamental and familiar part of the workflow of a DAW 130, but in this example, the channel would be of a new dedicated 'remote' channel type and would contain the producer-facing user interface for the certain functionality of the present teachings. Alternatively, functionality of the present teachings may be invoked via a menu item of the DAW 130 or other user interface option. It should be noted that certain functionality of the present teachings may also or instead be delivered in a standardized DAW track plug-in format, which may offer a producer a somewhat less friction-free workflow.

Thus, in certain aspects, a producer or the like may invoke an overdub session, define audio formats, and/or control collaborator membership (which may involve the use of centralized cloud-based services provided by another participant in the system 100). And, just as in a traditional in-person local recording session, the producer may control functionality such as play, stop, seek, record, etc., transport functions and may create and manage an independent audio content (e.g., local basic tracks) monitor mix to be sent to another user such as a collaborating overdub musician. Alternatively, the system 100 may provide a fully mirrored session as described herein.

The collaborator application 132 may be a lightweight and/or standalone (e.g., non-DAW) application and/or another (compatible) instance of the software of the DAW 130. In general, the collaborator application 132 may be responsible for receiving and/or controlling the monitor level of transferred audio content (or other content) as well as the collaborator's own input and/or input level. Note that the transferred audio content may be a stereo sub-mix and/or multiple discrete component tracks, thus offering the collaborator more granular control of their monitoring mix while recording. In an aspect, the collaborator application 132 may have no transport (e.g., play/stop/record) functionality. In this case, the collaborator application 132 may 'chase' the DAW 130 of the producer. The collaborator application 132 may be responsible for transferring overdub content audio (and/or MIDI, if applicable) back to the DAW 130. The collaborator application 132 may store collaborator audio (and/or MIDI, if applicable) persistently and/or temporarily, e.g., as a backup for the DAW 130 to re-fetch such as where there are network issues during a take. Additionally, local basic track sub-mix and/or MIDI information (if applicable) may be saved persistently by a user such as the collaborator. If already in a mirrored session (as described herein) on a compatible DAW 130, the collaborator may also request temporary producer status. In this case, the producer/collaborator roles may essentially be reversed.

As discussed above, certain features and functionality of the system 100 may be included on, and/or provided by, one or more of the participants of the system 100. By way of example, both the DAW 130 and the collaborator application 132 may call to a centralized, computer-based and/or cloud-based service (e.g., provided by the remote computing resources 140, the other resources 160, or another participant in the system 100), which may include one or more of the features and functionalities of the system 100. Also or instead, some of the features and functionalities of the system 100 may be found locally on a user device. Regardless of where they are situated and how they are accessed, various examples of features and functionalities of the system 100 are discussed below.

The system 100 may include a participant network (e.g., as part of the remote computing resources 140, the other resources 160, or another participant in the system 100, and/or stored on the database 150). In the context of music production, the participant network may be a musician network. The participant network may feature participants registered with the system 100 or a component thereof. The participant network may include a portal that includes artist biographies, musical examples, colleague recommendations, and so forth. Thus, the participant network may offer browsing/discovery of registered participants (e.g., system musicians) and may include biographies, work examples, ratings, recommendations, and so on. Additionally, the participant network may include a directory/portal that provides for the browsing/discovery of additive recording sessions and/or may allow collaborators and producers the ability to initiate remote additive recording session invitations. By way of example, the system 100, or a component/participant in the system 100, may include an additive recording and/or overdub "marketplace" or the like—e.g., where overdubbing musicians can offer their services for a fee, and where producers can shop for and hire collaborators based on demo material, by way of example. In certain aspects, these types of features, combined with a seamless workflow made possible by native DAW integration (such as that described herein), can effectively turn a previously solitary music production workflow into a networked global recording studio. In this manner, the system 100 can be an especially powerful platform in times of increased social and geographical physical isolation.

The system 100 may include session invitation management services offering users the ability to manage existing remote additive recording sessions and invitations. The user interface to the session invitation management services may be provided via an in-application DAW, lightweight client, external website, and/or mobile dedicated application. The session invitation management services may offer scheduled session reminders via user calendar insertion, in-DAW prompts, and/or background OS-level 'push' services, or the like.

The system 100 may include "mirrored session" support (e.g., when a collaborative application according to the present teachings includes a fully-featured and compatible DAW 130 rather than a lightweight collaborator client application), which may include transfer and management support for multiple discrete selections of audio content including support for the pre-fetching of multitrack and session information by the collaborator application 132 as well as multi-directional file synchronization and versioning of shared multiple discrete multitrack selections of audio content. Also or instead, mirrored session support may offer a collaborator and a producer the ability to exchange roles. In this case, their roles may essential reverse, permitting the collaborator to modify local basic tracks or other audio content, and/or permitting the producer to record locally to add to a session.

To better understand the mirrored session as well as the DAW 130 and collaborator application 132, a description of typical producer and collaborator roles for additive recording sessions (e.g., overdub sessions) will now be described. However, it will be understood that these roles are provided by way of example only, and many configurations and roles for users of the system 100 are also or instead possible. Turning back to typical roles of producers and collaborators, a producer is usually bound to one or more local projects in their DAW 130, while a collaborator is usually not. In either musical or audio post-production for film/video contexts, the producer-to-collaborator relationship may be one-to-many (e.g., a producer may have multiple collaborators). A producer usually owns a local DAW project while a collaborator usually does not. A producer usually invokes an overdub session and controls collaborator membership while a collaborator usually does not. A producer usually controls play/stop/seek/record transport functions during an overdub session while a collaborator usually does not. A producer usually manages the content to be added to by the collaborator as well as the sub-mix sent to the collaborator, while a collaborator usually does not (unless in mirrored session mode, for example as described above).

Therefore, a system 100 according to an embodiment of the present teachings may include: a first computing device 110 associated with a first user 111, the first computing device 110 including, or otherwise in communication with, a digital audio workstation 130 providing control over first audio content 112; a second computing device 120 associated with a second user 121, the second computing device 120 including, or otherwise in communication with, a collaborator application 132; a data network 102 interconnecting the first computing device 110 and the second computing device 120; and a processor 142 and a memory 144, the memory 144 storing computer executable code embodied in a non-transitory computer readable medium that, when executed, causes the processor 142 to perform the steps of: inserting one or more first watermarks within first data configured for transmission from the first computing device 110 to the second computing device 120, the first data corresponding to the first audio content 112; saving a temporal location of each of the first watermarks; transmitting the first data corresponding to the first audio content 112, with the first watermarks, to the second computing device 120; detecting the first watermarks at the second computing device 120 and replicating one or more time-aligned watermarks in second audio content 122; receiving the second audio content 122 at the first computing device 110 with the time-aligned watermarks; and, after the recording, aligning the time-aligned watermarks in the second audio content 122 with the first watermarks corresponding to the first audio content 112 resulting in a time-aligned additive recording 134 comprising both the first audio content 112 and the second audio content 122.

Figure 2:
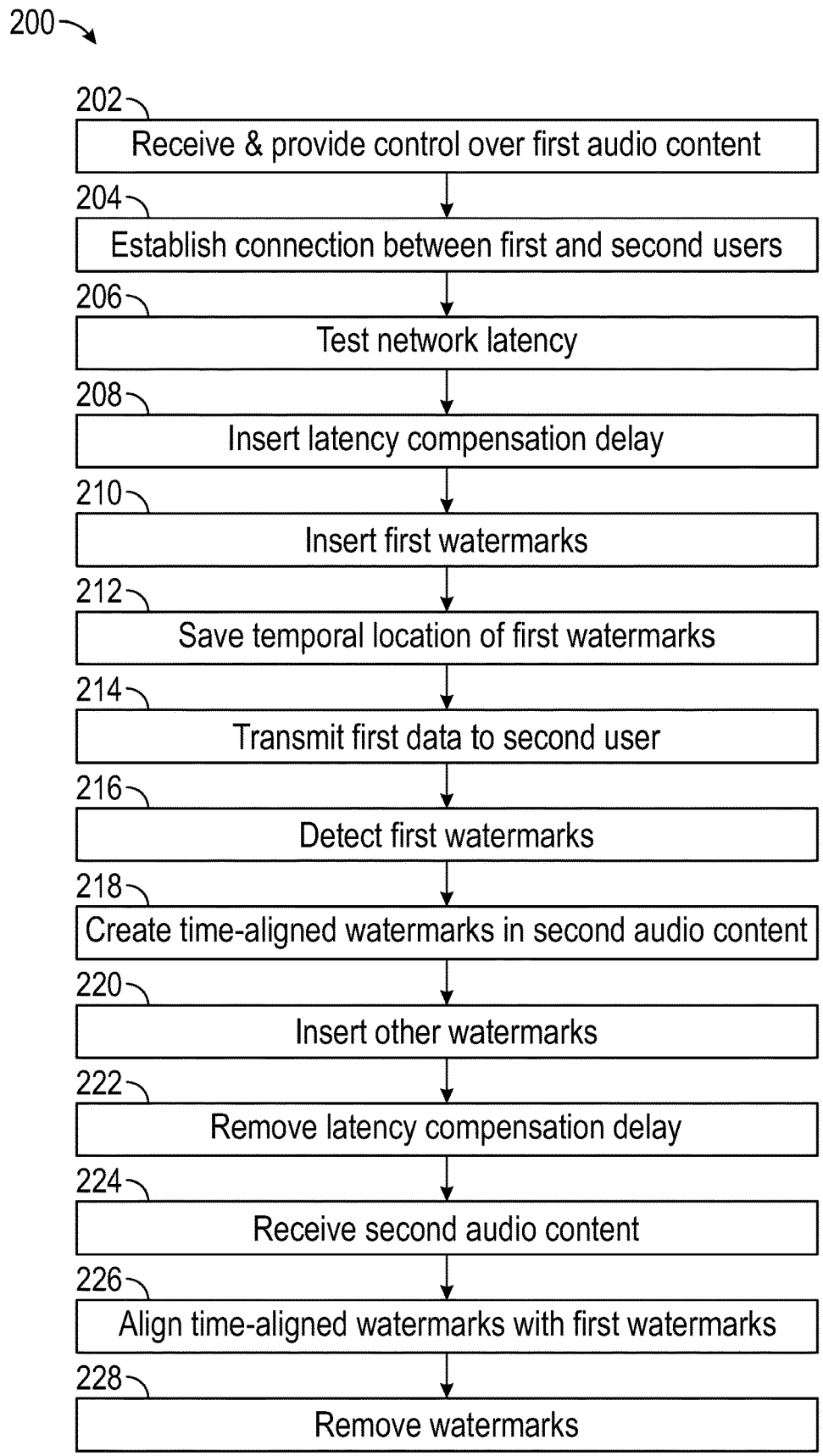
FIG. 2 is a flow chart of a method for time-aligned additive recording, in accordance with a representative embodiment.

FIG. 2 is a flow chart of a method for time-aligned additive recording, in accordance with a representative embodiment. The method 200 may be implemented using, for example, the system 100 described with reference to FIG. 1, or any of the systems described herein. In general, the method 200 may be used to compensate for latency and related issues that can occur during, for example, remote "tele-overdubbing" and the like—e.g., where a first user (e.g., a producer) and a second user (e.g., a content creator or collaborator) work together to create a cohesive piece of audio content that is substantially time-aligned, even when the first and second users are not in the same location and/or studio. This can be accomplished through the use of watermarks embedded within the actual foundational audio content that are replicated in the additive audio content and may be augmented with sequential multiple latency testing as discussed herein, and thus, the method 200 can be considered a technique for remote "overdub" recordings featuring watermark-based latency handling.

It will be understood that the description of the method 200, in general, may include a first user and a second user, where again the first user may be a producer or the like and the second user may be a content creator, collaborator, or the like. However, it will be understood that these types of users are merely used by way of example, and in some instances for convenience in understanding a salient use-case for the method 200, and thus it will be understood that other users are also or instead possible.

As shown in step 202, the method 200 may include receiving first audio content, e.g., in a digital audio workstation for use by a first user. In some instances, receiving first audio content includes a selection of audio content from a plurality of audio content, the selection made by a user in the method 200, e.g., the first user. Receiving first audio content may also or instead include creating the first audio content, e.g., by the first user. Further, and as shown in step 202, the method 200 may include providing control over first audio content at a digital audio workstation of a first user. For example, control over the first audio content may include functionality such as one or more of play, stop, seek, record, and the like. Further, control over the first audio content may also or instead provide the user with the capability of editing the first audio content to suit the needs of the user. The first audio content may include a sub-mix and/or one or more discrete component audio tracks. It will be understood that the digital audio workstation associated with the first user (or another user in the method 200) may be the same or similar to and/or compatible with any digital audio workstation as described herein.

As shown in step 204, the method 200 may include establishing a connection, over a data network, between the digital audio workstation of the first user and a computing device of a second user. The computing device of the second user may feature software and/or other applications configured for, or otherwise compatible with, collaboration between the first user and the second user as described herein. In certain aspects, the software included on the computing device of the second user is a fully-featured, compatible digital audio workstation—e.g., which can be the same as, or similar to, the digital audio workstation of the first user. In some aspects, the computing device of a second user may include a collaborator application, which may be the same or similar to any as described herein, such as a lightweight standalone (e.g., non-DAW) application and/or another compatible instance of software, which may be associated with the first user's digital audio workstation. Thus, stated otherwise, the computing device of the second user may include a collaborator application configured to receive and control a monitor level of one or more of the first audio content and the second audio content, and perform similar functions for the second user.

In certain implementations, the connection between the digital audio workstation of the first user and the computing device of the second user is effectively a mirrored session, which may be the same as or similar to the mirrored sessions described elsewhere herein. By way of example, such a mirrored session may include transfer and management support of at least the first audio content, e.g., as well as other audio content. A mirrored session may be advantageous for monitoring and/or collaborating for the creation of overdub audio and the like.

Before, during, or after the connection is established, the method 200 may further include creating an additive recording session at the digital audio workstation. The additive recording session may include one or more predefined audio formats, which may optionally be selected by one or more of the users of the method 200.

As shown in step 206, the method 200 may include testing latency between the digital audio workstation of the first user and the computing device of the second user, e.g., to determine a worst-case latency for use in producer-side time-aligned monitoring during the additive recording, such as in a mirrored session. This may include testing of network latency (delay in data transmission and the like over a data network) and/or computational latency and the like—e.g., latency that occurs when performing one or more of the tasks/steps of the present teachings and/or a networked system or the like upon which the present teachings is run. Thus, it will be understood that, unless explicitly stated to the contrary or otherwise clear from the context, that latency to be accounted for herein may include one or more of network latency, computational latency, and the like. Further, step 206 may more specifically include multiple, periodic background testing of latency between the digital audio workstation of the first user and the computing device of the second user between 'takes.' In cases of less stable network connections, the longest delay seen in individual test results may determine a worst-case latency for use in time-aligned monitoring. And, as shown in step 208, the method 200 may include inserting a latency compensation monitoring delay into the first audio content to account for the worst-case latency, e.g., based on such multiple sequential testing results. The worst-case result(s) of latency tests may be combined with anticipated required computational times on both the digital audio workstation of the first user and the collaborator application of the second user to result in an "in-take producer-local content monitor delay" (IPCMD) which may be inserted at the digital audio workstation to facilitate time-aligned monitoring of the first audio content and the second audio content for the first user during the actual recording. In other cases, roundtrip watermark-based latency detection may be used for determination of IPCMD (see below). Stated otherwise, the latency compensation delay may be inserted to facilitate a session where the first user can monitor, in a time-aligned manner, content being created/added by the second user (e.g., the second audio content) that is intended to be combined (in a specific time-aligned fashion) with the first audio content during the recording itself. By way of example, the first audio content may include music or the like and the second audio content may include overdub audio (e.g., a guitar solo, a voice recording, or the like) to be played over the music. By way of further example, the first audio content may include existing audio from a film/video production and the second audio content may include actor dialog lines (ADR). In either of these example, if the latency between the digital audio workstation of the first user and the computing device of the second user is anything significant (where more than a few milliseconds can be significant in this context), the combination of the first audio content and the second audio content being monitored by the first user may not sound as it is intended to sound, unless a latency compensation delay is used. Because a latency compensation delay may only be pertinent to time-aligned monitoring, in certain aspects, after the time-aligned monitoring, the latency compensation delay is disabled or removed from the first audio content.

The testing of latency may be automatically conducted when the first user and the second user share an active connection, e.g., testing latency may be conducted automatically in the background. Testing may be based upon sending/detecting/replicating/returning of 'standalone' (non-embedded) watermark signals to best emulate the actual full 'round-trip' additive recording process. Moreover, testing latency may be conducted even when not actively conducting an additive recording session so that the worst-case latency is current. That is, the testing of latency may be conducted at several points during an active connection (e.g., testing latency may be conducted substantially continuously, on a periodic basis, combinations thereof, and the like), so that the worst-case latency used in the method 200 is current. In this manner, when a current worst-case latency is greater than a previous worst-case latency, the method 200 may include adding additional overhead latency compensation delay at a start of a subsequent additive recording session to mitigate network-related audio delivery issues experienced during the session. In some aspects, the method 200 may include saving a history of data from testing latency. In this manner, a worst-case latency from the history of data from testing latency may be used (or at least used as a factor) when determining what amount of latency compensation delay to insert. In certain implementations, the testing of latency may be paused during one or more additive recording sessions. The method 200 may further include detecting a network-related delivery error using data derived from testing network latency or other latency. Note that the method 200 may also or instead determine latency by the round-trip time difference between first user-side transmission and the reception of initial second user-replicated watermarks as described below.

As discussed herein, the method 200 may utilize the insertion of first watermarks into the first audio content and the insertion of corresponding time-aligned watermarks into the second audio content during the additive recording itself. The first watermarks and/or the time-aligned watermarks may be used to align the first audio content with the second audio content to create a time-aligned additive recording comprising both the first audio content and the second audio content. Additionally, in some instances, the greater of (i) the worst-case latency and (ii) a largest time difference between a first audio content watermark and a corresponding time-aligned watermark is used at the digital audio workstation to facilitate time-aligned monitoring of the first audio content and the second audio content. That is, if the worst-case latency is larger than any time difference between corresponding watermarks, the worst-case latency may be used as the latency compensation delay to facilitate time-aligned monitoring of the first audio content and the second audio content. And, if any time difference between corresponding watermarks is greater than the worst-case latency, the greatest time difference between corresponding watermarks may be used as the latency compensation delay to facilitate time-aligned monitoring of the first audio content and the second audio content during the recording itself. Similar to the above, after the time-aligned monitoring, the inserted delay may be disabled or removed.

As shown in step 210, the method 200 may include inserting one or more first watermarks within first data configured for transmission from the digital audio workstation of the first user to the computing device of the second user. The first data may correspond to the first audio content—e.g., the first data may include one or more packets (or the like) of data that is transferred from the first user to the second user for the purpose of transferring the first audio content from the first user to the second user. In some instances, the first data may itself be the first audio content. In some implementations, the same can be said for the time-aligned watermarks—they can be inserted into the second audio content and/or data for transmission that is associated therewith.

As shown in step 212, the method 200 may include saving a temporal location of each of the first watermarks. In general, the watermarks discussed herein may be temporally defined in at least two ways: (i) in terms of the precise real time (e.g., OS-level real time) of their insertion (and, in certain aspects, this time may be used to calculate a monitor delay, e.g., during a mirrored session or the like); and/or (ii) in terms of the precise location relative to the running digital audio workstation timeline and/or another application-level and/or audio-content-level timeline (and, in certain aspects, this time may be used to calculate realignment of audio content, e.g., after a mirrored session or the like, or otherwise after second audio content is added or created). Stated otherwise, the temporal location of at least one of the first watermarks may correspond to one or more of (i) a timeline corresponding to the first audio content (e.g., a digital audio workstation project timeline), and (ii) a time of day.

In certain aspects, at least one of the first watermarks corresponds to a start of the first audio content. For example, at least one of the first watermarks may be placed at the precise start of the first audio content and/or adjacent to the start of the first audio content. Also or instead, at least one of the first watermarks may correspond to a start position for the second audio content. This may be a known position and/or a preferred position for the start of the second audio content, e.g., as set by one or more of the first user and the second user. It will be further understood that one or more of the watermarks as described herein may be audible to a human, or inaudible to a human.

An example use-case for understanding the insertion of first watermarks will now be described, i.e., using the example of a producer and collaborator working together to create an overdub recording. In this example, as a 'take' recording starts, an aspect of the present teachings may be configured to generate a short series of one or more 'start' audio watermarks, which again, may be audible and/or inaudible to a human. The digital audio workstation of the producer may be implemented to embed these 'start' watermarks into the first audio content (e.g., a local basic tracks sub-mix) to be transferred to the second user (e.g., the collaborator) and to store the precise embedded location(s) relative to the running digital audio workstation project timeline of the producer as well as the precise OS-level real time of their insertion/transmission (e.g., in memory such as application random-access memory (RAM)). Continuing with this example, as a 'take' recording ends, an aspect of the present teachings may be configured to generate and embed a series of one or more 'end' audio watermarks, and although not strictly required, the present teachings may also store the precise embedded 'end' watermark location(s) relative to the running digital audio workstation project timeline of the producer as well as the precise OS-level real time of their insertion/transmission (e.g., in memory such as application RAM). Additionally, for example in use-cases in which highly unstable pre-take network conditions are observed or during lengthy overdub takes, an aspect of the present teachings may be configured to generate additional (e.g., inaudible) watermarks periodically within the take for additional granularity when reconciling second audio content (e.g., overdub audio) relative to first audio content (e.g., local basic tracks audio).

Turning back to the method 200 of FIG. 2, as shown in step 214, the method 200 may include transmitting the first data corresponding to the first audio content, with one or more first watermarks inserted/embedded therein, to the computing device of the second user. It will also be understood that, in certain implementations, the method 200 further includes transferring information from a musical instrument digital interface or the like through the connection between the digital audio workstation and the computing device.

As shown in step 216, the method 200 may include detecting the first watermarks at the computing device of the second user, and as shown in step 218, the method 200 may include creating time-aligned watermarks in second audio content from the second user. Stated otherwise, the method 200 may include replicating one or more time-aligned watermarks (e.g., relative to one or more of the first watermarks) in second audio content from the second user (and/or in data associated therewith). In certain implementations, aligning one or more time-aligned watermarks in the second audio content with one or more first watermarks comprises adding a delay greater than or equal to a largest time difference between one of the first watermarks and a corresponding one of the time-aligned watermarks. In this manner, a worst-case temporal difference can be used as the delay. More generally, the delay may be introduced during a monitoring session in the digital audio workstation to facilitate time-aligned monitoring of the first audio content and the second audio content. Similarly, the added delay may be disabled or removed after monitoring the time-aligned additive recording. After a recording where the second audio content is used, created, and/or introduced with the first audio content, the round-trip time difference between first user-side transmission and reception of initial second user-replicated watermarks may be used to move the second audio content (which, in some aspects, may be newly recorded and/or remotely-sourced) to a temporal position that is earlier in the digital audio workstation timeline to facilitate a resulting recording of the second audio content that is time-aligned to the first audio content. Thus, steps 216 and 218 in the method 200 may include collaborator-side replication of the watermarks created on the producer-side. That is, software associated with the second user (e.g., collaborator) may detect watermarks in the incoming first audio content, and replicate corresponding time-aligned watermarks in the second audio content to be transferred to the first user (e.g., producer).

The method 200 may further include detecting a network-related delivery error using one or more of the first watermarks and the time-aligned watermarks, and/or any of the watermarks discussed herein.

As shown in step 220, the method 200 may include inserting other watermarks, in addition to, or instead of, the first watermarks and corresponding time-aligned watermarks discussed above. By way of example, the method 200 may further include inserting one or more second watermarks corresponding to an end of an additive recording, and storing a temporal location of each of these second watermarks. One use-case for such "end" watermarks may be for the digital audio workstation of the first user to check the alignment of these "end" watermarks as a checksum—e.g., if these watermarks are not in absolute alignment, some network discrepancy may have occurred during the recording, and in such instances, the second audio content may be re-fetched from the second user (e.g., from backup memory in RAM).

Also or instead, the method 200 may include inserting one or more third watermarks during the additive recording, and storing a temporal location of each of these third watermarks. One use-case for such "during" watermarks (i.e., watermarks inserted during the additive recording session) may be for a reconciliation of variable latency as a result of changing network conditions during the recording itself. For example, if multiple watermark locations are disposed within an additive recording and/or in the second audio content, the method 200 may include making one or more reconciliations within a take—e.g., where detecting silence in the second audio content may be used to determine an optimal location to be such a 'splice point' for post-take realignment of the second audio content.

In certain aspects, at least one of the second watermarks and the third watermarks discussed above may be inserted when a predetermined condition is met. The predetermined condition may include at least one of (i) detection of an unstable network connection and (ii) the additive recording having a duration above a predetermined threshold. Stated otherwise, these watermarks may be useful for situations involving relatively unstable network connections and/or for relatively lengthy recordings.

As shown in step 222, the method 200 may include removing the temporary latency compensation delay, which may be in the form of in-take producer-local content monitor delay (IPCMD). For example, after a time-aligned monitoring session and/or after the creation of the second audio content, the latency compensation delay may be disabled or removed from the first audio content. This may be because such latency compensation delay may be unnecessary at this point in the present teachings, e.g., because the entire additive recording will be utilized through the digital audio workstation of the first user, and not over the network (thereby rendering compensation for delay in a network connection moot).

As shown in step 224, the method 200 may include receiving the second audio content (and/or data associated therewith) at the digital audio workstation of the first user with at least one or more time-aligned watermarks inserted therein. And, as shown in step 226, the method 200 may include aligning one or more of the time-aligned watermarks in the second audio content with one or more of the first watermarks corresponding to the first audio content at the conclusion of the recording—where this operation may result in a time-aligned additive recording comprising both the first audio content and the second audio content. It will be understood that the alignment of the time-aligned watermarks associated with the second audio content with the first watermarks associated with the first audio content may be done during a monitoring session and/or after such monitoring when the second audio content is received by the first user.

As shown in step 228, the method 200 may include removing at least one of the watermarks—e.g., at least one of the time-aligned watermarks and/or the first watermarks from the time-aligned additive recording that is saved on the digital audio workstation. In certain implementations, removal of watermarks is conducted via digital audio signal processing (DSP) or the like. Removal of the watermarks may occur on the first user's side of the system (e.g., the producer side, such as on the digital audio workstation of a producer). By way of example, after use for post-take realignment of the second audio content relative to the first audio content as explained above, one or more watermarks (e.g., all of the watermarks) may be removed from the additive recording (and/or from either the first audio content and the second audio content) either by use of DSP, and/or in the case where watermarks are placed clear of the start and end of a usable additive recording, they may simply be trimmed from the additive recording.

The method 200 may also or instead include other functionality that can be useful for the present techniques. For example, the method 200 may further include playing the time-aligned additive recording on the digital audio workstation or otherwise. The method 200 may also or instead include saving the time-aligned additive recording on the digital audio workstation or otherwise.

Therefore, as described above and throughout this disclosure, the method 200 may be used to overcome issues stemming from latency and "jitter" as described herein. That is, using the example of a producer and a collaborator working together to create an overdub recording, the present teachings (e.g., the system 100 of FIG. 1 and/or the method 200 of FIG. 2), may be configured to conduct peer-to-peer internet latency testing between a digital audio workstation of a producer and an application of a collaborator (e.g., a lightweight version of the producer's digital audio workstation) periodically and/or continuously in the background automatically when a producer and collaborator share an active connection, and when the digital audio workstation is not in <play> or <record play> modes. In this way, it can be said that the present teachings may intend to make the best use of this idle time between 'takes' to obtain both (i) the freshest, worst-case latency data possible relative to the start of each take to use during that take, and (ii) a per-session saved history of iterative latency tests (e.g., where results are saved in RAM or otherwise during the session). Multiple testing operations may be valuable because, while jitter is typically a packet-level metric affecting the results of a single latency test, repeated periodic latency test results generally can make a higher-level "jitter of the jitter" metric possible (in this sense, jitter may be thought to occur on two levels, between packets and between latency tests). For example, if higher inter-test jitter is observed at the start of any individual take, the present teachings may be configured to add additional unobserved overhead latency compensation delay at the start of that take to help minimize the possibility of network-related audio delivery issues during the take. And, because latency of even up to approximately one second will likely be perceived by a user only as a relatively slight decrease in user interface responsiveness, when calculating a static latency compensation delay value, the present teachings may be configured to prioritize stable, error-free audio delivery over absolute delay minimization. Once a take starts, further internet latency testing may temporarily pause, both to conserve bandwidth during the 'take' itself and because the present teachings may instead make use of in-take watermarks during the take for both the later realignment of collaborator overdub content and to detect any in-take network-related delivery errors at the end of each take (note, however, in cases such as extremely unstable network conditions, the present teachings may continue to conduct latency tests during a take). Note that the system 100 may also determine in-take producer-local content monitor delay (IPCMD) by using the round-trip time difference between first user-side transmission and the reception of initial second user-replicated watermarks as described below.

Figure 3:
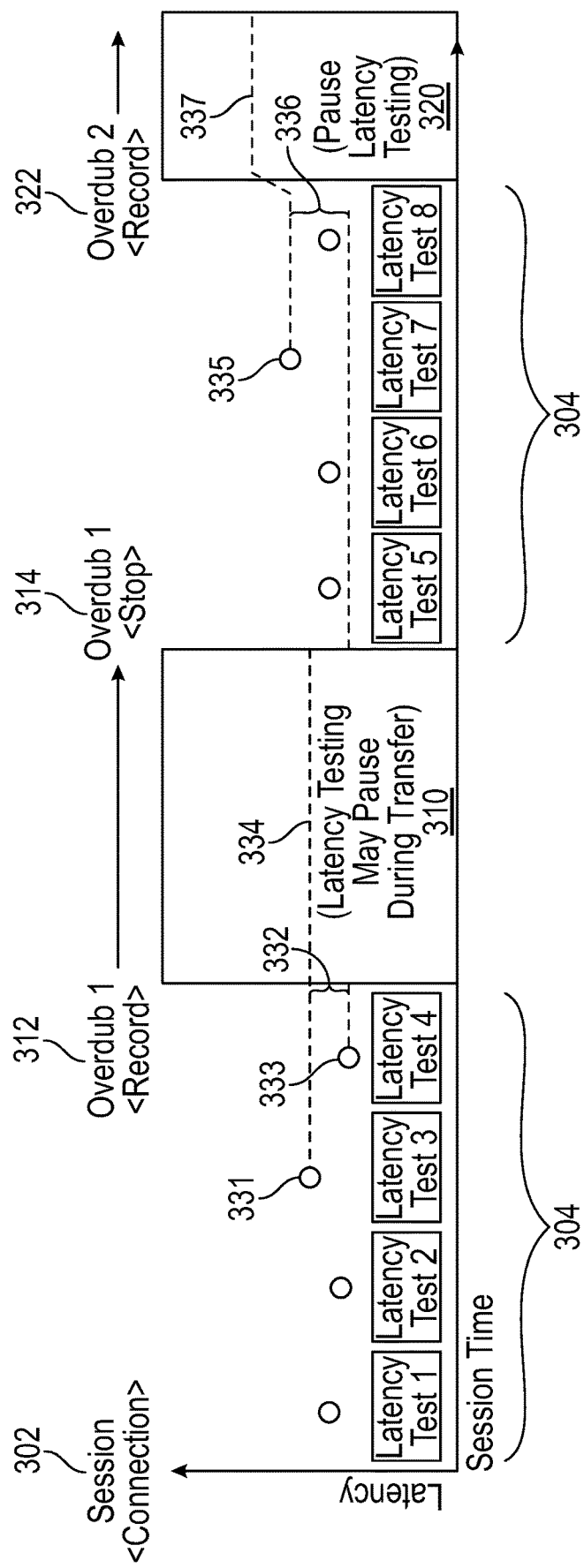
FIG. 3 is an illustrative example of latency testing, in accordance with a representative embodiment.

FIG. 3 is an illustrative example of latency testing, in accordance with a representative embodiment. In particular, FIG. 3 includes a graph showing latency versus time during an 'overdub' session as an example use-case of the present techniques. The start 302 of the session is represented at the at the origin where time for the session continues along the x-axis, and latency is represented by points along the y-axis. In this example, the start 302 of the session coincides with a connection being established between two users—e.g., a first user in the form of a producer or the like, and a second user in the form of a collaborator or the like. As can be seen in the figure, multiple latency tests 304 may be conducted during a session, where such testing can be paused automatically and/or manually—e.g., during recording periods. For example, a first recording period 310 may have an associated start 312 and an end 314, and a second recording period 320 may have an associated start 322 and an end (not shown). Each of the points above the latency tests 304 represent a measured latency.

As shown in the figure, test result 331 may represent the highest (e.g., worst-case) latency yet observed during the testing, which may include substantially continuous iterative testing when the system is at rest between actual takes. Variance 332 shows the difference between the highest latency yet observed (test result 331) and the lowest latency yet observed, test result 333. This variance 332 may represent the "jitter of the jitter" metric discussed herein. Because the "jitter of the jitter" metric may be an acceptable, highest (worst-case) latency yet observed during the latency tests 304, this metric may be used to calculate the temporary in-take producer-local content monitor delay (IPCMD) that is used for the first recording period 310 represented by the first line 334 in the figure.

Test result 335 in the figure may represent the highest (e.g., worst-case) latency observed during the latency tests 304 that follow the end 314 of the first recording period 310. And, this may be the highest (e.g., worst-case) latency yet observed during the entire session, where it is understood that the test results from the period before the start 312 of the first recording period 310 may be saved for comparison and the like. Variance 336 shows the difference between the highest latency yet observed (test result 335) and the lowest latency yet observed, test result 333. Because this "jitter of the jitter" metric may not be acceptable, additional overhead that is beyond the worst-case latency yet observed (test result 335) may be used to calculate the temporary in-take producer-local content monitor delay (IPCMD) that is used for the second recording period 320 represented by the second line 337 in the figure (it should be recognized that adding sufficient overhead to the temporary monitor delay in order to account for variable network conditions during the recording itself may be more valuable than using the shortest possible temporary monitor delay).

Several example use cases for the present teachings will now be described.

Figure 4:
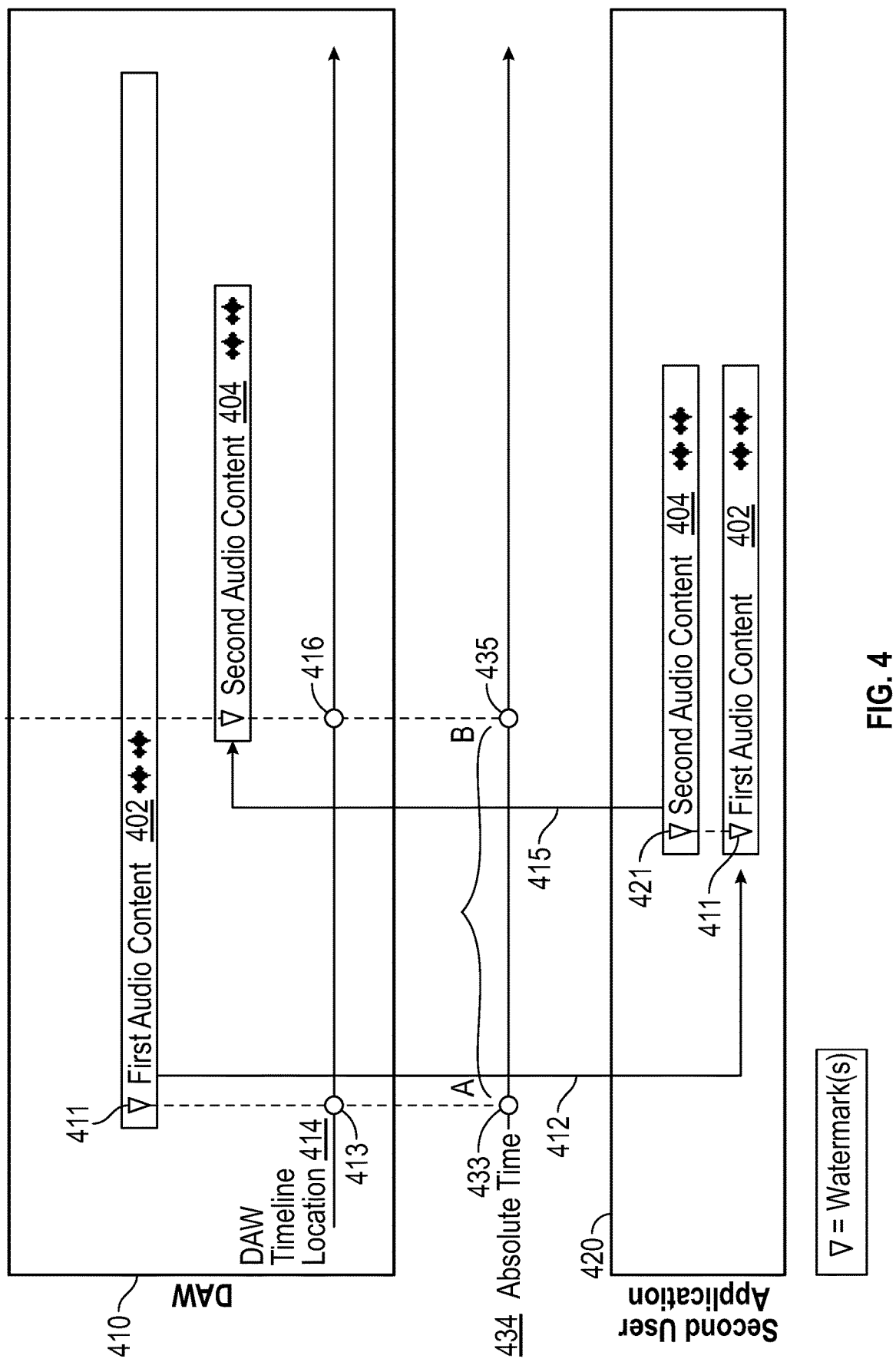
FIG. 4 is an illustrative example of an "in-take" workflow, in accordance with a representative embodiment.

FIG. 4 is an illustrative example of an "in-take" workflow, in accordance with a representative embodiment. The example used in FIG. 4 includes a producer as the first user and a collaborator as the second user. A producer may invoke the system simply by inserting first audio content 402 into the digital audio workstation (DAW 410), which may be disposed on or otherwise in communication with a computing device of the producer. The first audio content 402 may thus include an additional channel (or 'track') that is added into a DAW session (e.g., a new dedicated 'remote' channel type), and/or the first audio content 402 may be established by selecting a DAW menu/user interface option and initiating a connection to a collaborator. It should be noted that, in some implementations, this is largely the extent of user input that may be used, where one or more of the following tasks described with reference to FIG. 4 may be autonomously initiated and managed by a system according to the present teachings.

At the DAW 410, the producer may connect to a collaborator—e.g., to a second user application 420 associated with the second user, who again is a collaborator in this example. This may begin latency testing as described herein—e.g., sequential iterative latency testing between the producer and the collaborator may begin. Note that, to enable interpersonal communication, bidirectional between-take microphone audio connectivity (or the use of non-related audio/video teleconferencing solutions) may be initiated at this time.

When the producer initiates a session—e.g., by entering <record-play> on the DAW 410—one or more of the following may simultaneously occur before the first audio content 402 (which may include mirrored session multitrack audio content) is sent to the collaborator as shown by the line 412 in the figure. One or more first watermarks 411 (which may include machine-readable "start" audio watermarks) may be provided within data associated with transmission of the first audio content 402—e.g., a first watermark 411 may be prepended to the start of the first watermarks 411 as an integral part of audio to be transferred to the collaborator. The time 413 along the DAW project timeline 414 and the real time 433 along the host OS timeline 434 may be stored, e.g., in volatile RAM associated with the DAW session. Stated otherwise, both the precise running DAW project timeline watermark embed locations and the real time (host OS time) may be stored in volatile RAM in the producer DAW session, or otherwise stored. It is worth noting that the above tasks could include some minor audio buffering before the first audio content 402 is sent to the collaborator—however, to preserve a 'crisp' responsive user experience for the producer that best emulates an in-person live recording session, playback of the local first audio content may commence immediately while the above initial tasks are carried out in the background.

Then, as shown by the line 412, the first audio content 402 (which again may include mirrored session multitrack audio content) may be sent to the collaborator. At the second user application 420 associated with the collaborator, as the first audio content 402 is received, the first watermark 411 may be detected, and an associated corresponding watermark 421 may be correspondingly embedded into second audio content 404 created by or otherwise associated with the collaborator/second user. For example, time-aligned corresponding "start" watermark(s) may be detected and correspondingly embedded into and/or prepended as a part of the second audio content 404 being generated to be transferred back to the DAW 410 associated with the producer. It should be noted that this operation may incur minor computational delay. Then (e.g., only then), transmission of the second audio content 404 may be sent to the DAW 410 associated with the producer as shown by line 415.

At the DAW 410 associated with the producer, the corresponding watermark 421 may be detected (e.g., where such a watermark may be disposed at the start of the second audio content 404, which was created in alignment to the first watermark 411 of the first audio content 402 at the second user application 420). This may trigger the DAW 410 to determine the difference between the precise real time of the detected overdub corresponding watermark 421 and the (earlier) precise real time of the first watermark 411 (e.g., the local initial watermark insertion), and to delay producer monitoring of the first audio content 402 by that amount plus any meaningful computational time required to manage the above watermark-related tasks up until this point.

At the DAW 410 (e.g., when a <record-stop> occurs), the following may occur—one or more machine-readable "end" audio watermarks may be appended to the end of one or more of the first audio content 402 or the combination of the first and second audio content (e.g., the additive recording) as an integral part of audio transfer before the end of the audio transmission to the collaborator. Although not required, the precise running DAW project timeline location of the injected 'end' watermark(s) may be stored, e.g., in fast-access volatile RAM in the DAW 410.

At the second user application 420, upon detection of the received "end" watermark(s), the second user application 420 may embed and/or append time-aligned corresponding "end" watermarks to the end of the second audio content 404 to be transferred back to the producer at the identical, precise location relative to the DAW project timeline 414. It should be noted that this may include some minor initial audio buffering of the second audio content 404 to allow for identical placement. Then, the second user application 420 may complete the additive recording transfer to the producer and/or DAW 410.

Therefore, in FIG. 4, a producer may enter <record-play>, and a "start" watermark (the first watermark 411) may be generated and applied to the first audio content 402 to be transferred to the collaborator, where the temporal locations of this watermark may be stored (point A in the figure shows the real time 433 along the host OS timeline 434 that is stored). Then, the first audio content 402 may be transferred to the collaborator, where the second user application 420 may detect and replicate the "start" watermark, and embed the replicated corresponding watermark 421 into second audio content, which may be overdub audio such that the overdub audio is in synchronization with the first audio content 402. The collaborator may continue to perform overdub creation that is in synch with the first audio content 402 during a session. The second audio content 404 (e.g., overdub content) may then be transferred to the producer. The DAW 410 of the producer may detect and replicate the "start" watermark(s), where the DAW 410 accounts for the running timeline location 416 and absolute time shown by point B in the figure, and demarcated as time 435. The DAW 410 of the producer may then delay the monitoring of the first audio content 402 by the absolute time amount (e.g., equal to point B minus point A, i.e., the difference between time 435 and time 433) such that the first audio content 402 and the second audio content 404 are heard in precise synchronization. The aforementioned thus describes an example of an in-take monitor delay.

Figure 5:
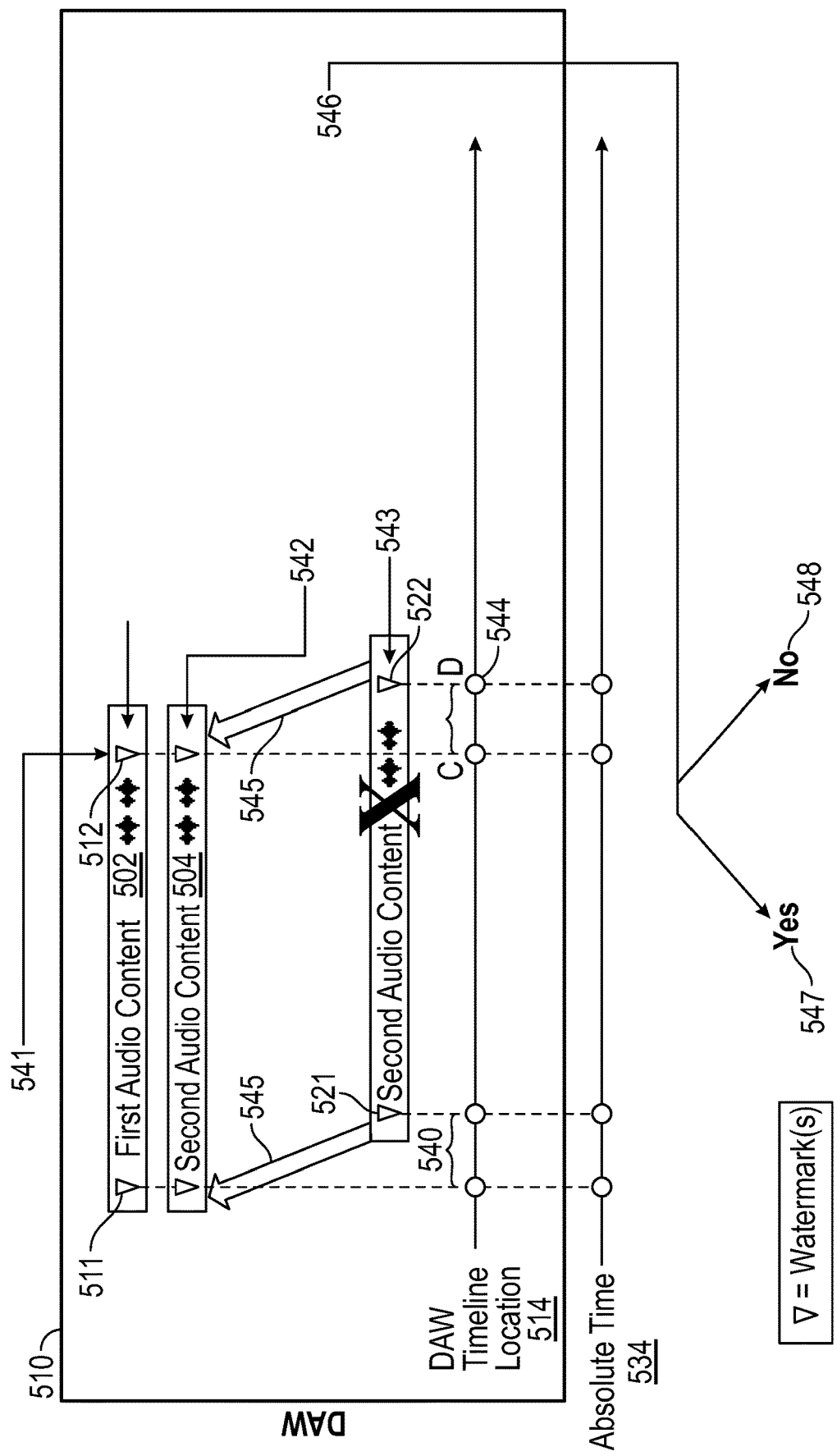
FIG. 5 is an illustrative example of a "post-take" workflow, in accordance with a representative embodiment.

FIG. 5 is an illustrative example of a "post-take" workflow, in accordance with a representative embodiment. Specifically, this figure demonstrates techniques that can be performed upon completion of an overdub session or the like where an additive recording is formed that includes first audio content 502 and second audio content 504, and where one or more of the following have been received at a DAW 510: the first audio content 502, the second audio content 504, and the additive recording. At this point, the DAW 510 may (e.g., automatically and transparently) perform the operation of sliding the location of the second audio content 504 relative to the DAW project timeline 514 so that a time-aligned watermark 521 thereof (e.g., a 'start' watermark) precisely aligns with the location along the DAW project timeline 514 of a corresponding first watermark 511 (e.g., a corresponding 'start' watermark, or otherwise a first watermark 511 initially generated and embedded into the first audio content 502, and/or data associated therewith, as transferred to a collaborator or the like at the start of a take). Note this may be a direct alignment of the generated first audio watermarks and the replicated second audio watermarks rather than a time-based operation, although the resulting time difference between the two locations within the producer DAW timeline may be referred to as the post-take additive content alignment amount (PACAA) as described below. It should be noted that this this time amount 540 should be equal to the latency compensation delay described herein, but not necessarily equal to the in-take monitor delay (e.g., see the description of the latency compensation delay (specifically, PACAA) vs. in-take monitor delay (specifically, IPCMD) included below).

The DAW 510 may also or instead check alignment of an "end" watermark 512 of the first audio content 502 and an "end" watermark 522 of the second audio content 504. This may be done as essentially a checksum—e.g., where if these watermarks are not in absolute alignment, some network discrepancy could have occurred during the take, so the second audio content 504 may be re-fetched from memory, e.g., from a collaborator application backup in RAM. It is also worth noting that, when using multiple watermark locations within an additive recording, the present teachings may make multiple reconciliations within a take, and may detect silence in the second audio content 504 to determine one or more optimal 'splice point' locations at which to do so.

The original record time(s) of the now-local (relative to the DAW 510) second audio content 504 may also or instead be updated to reflect the permanent latency reconciliation time-alignment and/or to provide an updated original recording time <undo> functionality within the DAW session. At this point, one or more of the watermarks may be removed from the second audio content 504 and/or the additive recording on the DAW 510.

Objects stored in memory related to this particular "take" (including watermark locations and delay amounts in the DAW 510 and backup second audio content 504 in a collaborator application or the like) may also or instead be discarded. However, it should be noted that latency test results may be saved for the entire session in order to obtain the freshest and best representation of a worse-case latency and/or to get a richer representation of "jitter of the jitter" as described herein.

Thus, the "post-take" operations shown in the figure by way of example may include a producer stopping a recording as shown by arrow 541. This may cause the creation of an "end" watermark 512 of the first audio content 502, e.g., embedded therein. The location of this "end" watermark 512 may be saved relative to one or more of the DAW project timeline 514 and an absolute timeline 534. As shown by arrow 542, the "end" watermark 512 of the first audio content 502 may be transmitted to the collaborator (e.g., via the collaborator application or the like), where it can be detected, replicated, and where an associated "end" watermark 522 for the second audio content 504 may be embedded therein (or in data associated therewith). Specifically, as shown by arrow 543, as the transfer of the second audio content 504 from the collaborator application or the like to the producer or the like via a DAW 510 is completed, an "end" watermark 522 for the second audio content 504 may be detected (and an associated temporal location 544 thereof) by the DAW 510. The temporal location 544 may be saved relative to one or more of the DAW project timeline 514 and an absolute timeline 534. As shown by arrows 545, the present teachings (via the DAW 510) may move the first audio content 502 to an earlier temporal location in the DAW project timeline 514 such that the 'start' watermark (or otherwise a first watermark 511) and the time-aligned watermark 521 corresponding thereto (e.g., a 'start' watermark of the second audio content 504) are placed in precise synchronization. As shown by arrow 542 and arrow 546, after aligning the content by the start watermarks or the like as described with reference to arrows 545, the present teachings (via the DAW 510) may check alignment of the "end" watermark 512 of the first audio content 502 with the "end" watermark 522 of the second audio content 504. If they are in precise alignment, as shown by arrow 547, the system may infer a successful transfer of the second audio content 504 and/or additive recording from the collaborator application, thereby completing the process. If they are not in precise alignment, as shown by arrow 548, the system may infer a faulty transfer of the second audio content 504 and/or additive recording from the collaborator application, and thus may request a re-fetch, e.g., from the collaborator application and/or a cloud-based service or the like.

Having described the specific examples shown in FIGS. 4 and 5, an example of in-take producer-local content monitor delay (IPCMD) versus post-take additive content alignment amount (PACAA) will be described:

consider that prior to transmission of producer-local content, the producer DAW may generate/embed/store DAW time locations of watermarks, and that this task requires 25 milliseconds to compute;

also consider that the worst-case result of multiple watermark roundtrip-based background latency testing prior to the actual recording (with or without additional 'safety' delay added) is 230 milliseconds;

also consider the collaborator application requires 50 milliseconds to detect/replicate watermarks; and also consider that the producer DAW requires 50 milliseconds to detect watermarks in the newly-arrived second audio and time-shift that second audio earlier to align watermarks between (un-delayed) first and second audio.

In the above example for consideration, when the producer initiates an overdub recording, the DAW generates and embeds watermarks and immediately starts sending first audio to the collaborator application from the current location in the timeline of the DAW project. To provide a crisp user experience for the producer, the DAW also starts local playback immediately, but starts that local playback earlier than the actual current location in the timeline of the DAW project by an amount equal to the total of the above: 305 milliseconds. As a result, at this point first audio is sending to the collaborator 280 milliseconds ahead of the (temporarily delayed) first audio content that the producer is hearing (305 milliseconds temporary monitor delay minus 25 milliseconds producer DAW computational time). That is, local playback of the first audio content at the DAW may be initiated earlier in time relative to a temporal position of the first audio content as transmitted to the collaborator to facilitate time-aligned monitoring of the first audio content by the producer relative to the collaborator. Assuming 110 milliseconds of actual network latency for the transmitted first audio to arrive at the collaborator application, it is now 170 milliseconds ahead of the (temporarily delayed) first audio content that the producer is hearing. Assuming 105 milliseconds of actual network latency for the transmitted second audio to arrive back at the producer DAW, the second audio content is now 15 milliseconds ahead of the (temporarily delayed) first audio content that the producer is hearing (105 milliseconds network latency plus 50 milliseconds collaborator application computational time). This is likely because the DAW may have used a worst-case latency with additional 'safety' time to define the temporary monitor delay. Therefore, the producer DAW may align the watermark locations of the incoming second audio with the watermark locations of the first audio to further delay ingesting the incoming second audio 15 milliseconds in this case, achieving auditory synchronization of the second audio with the (temporarily delayed) first audio during the recording itself (note that the two are not actually synchronized yet).

Immediately after the additive recording is complete (when the producer DAW goes from <record-play> to <stop>), the temporary 305 millisecond monitor delay is automatically removed from the first audio. At this point the newly recorded second audio will be 305 milliseconds late relative to the now un-delayed first audio—to rectify this, the producer DAW may time-shift the permanent location of the newly recorded second audio earlier in the timeline of the DAW project such that the (un-delayed) first audio and corresponding second audio watermark location(s) align in the timeline of the DAW project, and/or may use the monitor delay amount for the just-completed take as an absolute or checksum.

As an additional example, consider that for any reason the worst-case result of pre-take multiple sequential network latency testing is higher than the actual audio-with-watermark roundtrip. In this case, the IPCMD will be the larger safe time value, while the PACAA will be the smaller actual value. It will be understood that other in-take monitor delays and post-take latency compensation delays are possible, and the above are just two examples.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionalities may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from the same.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings.

Unless the context clearly requires otherwise, throughout the description, the words "comprise," "comprising," "include," "including," and the like are to be construed in an inclusive sense as opposed to an exclusive or exhaustive sense; that is to say, in a sense of "including, but not limited to." Additionally, the words "herein," "hereunder," "above," "below," and words of similar import refer to this application as a whole and not to any particular portions of this application.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method for time-aligned additive recording, the method comprising:
   providing control over first audio content at a digital audio workstation of a first user;
   establishing a connection, over a data network, between the digital audio workstation of the first user and a computing device of a second user;
   prior to and in-between individual additive recordings, inserting one or more first watermarks within first data configured for transmission from the digital audio workstation of the first user to the computing device of the second user, the first data corresponding to the first audio content, wherein the first audio content includes lossless audio;
   transmitting the first data corresponding to the first audio content, with the one or more first watermarks, to the computing device of the second user;
   detecting the one or more first watermarks at the computing device of the second user and replicating one or more watermarks in second audio content from the second user, each of the one or more watermarks embedded within the second audio content at a temporal location corresponding to the temporal location of a first watermark embedded within the first data of the first audio content, wherein the second audio content includes lossless audio;
   receiving the second audio content at the digital audio workstation of the first user with the one or more replicated watermarks;
   during creation of each additive recording, facilitating time-aligned monitoring by the first user of the first audio content relative to the second audio content by, upon the first user initiating an additive recording, immediately initiating local playback of the first audio content at the digital audio workstation of the first user at a point earlier in time relative to a temporal position of the first audio content as transmitted to the second user, wherein a difference in temporal positions of the local playback and the temporal position of the first audio content as transmitted to the second user includes at least a round-trip time difference between transmission of at least one of the first watermarks within the first audio content to the second user and reception of a corresponding replicated second watermark within the second audio content at the digital audio workstation of the first user from a play/record temporal location in the digital audio workstation of the first user; and
   aligning the one or more watermarks in the second audio content with corresponding first watermarks inserted within the first audio content resulting in a time-aligned additive recording comprising both the first audio content and the second audio content.

2. The method of claim 1, further comprising testing latency between the digital audio workstation of the first user and the computing device of the second user to determine a worst-case latency.

3. The method of claim 2, wherein testing latency is conducted when not actively conducting one or more additive recordings so that the worst-case latency is current.

4. The method of claim 2, wherein one of (i) the worst-case latency and (ii) a largest time difference between a first watermark and a corresponding replicated watermark is inserted between the temporal location of the local playback and the temporal location of the first audio content as transmitted to the second user.

5. The method of claim 2, further comprising establishing an earlier temporal starting location for the first user at the digital audio workstation equal to at least one of (i) the worst-case latency and (ii) a largest time difference between a first watermark and a corresponding replicated watermark to facilitate time-aligned monitoring of the first audio content and the second audio content during the additive recording.

6. The method of claim 1, wherein the computing device of the second user includes either a standalone client application or digital audio workstation software compatible with software of the digital audio workstation of a first user.

7. The method of claim 1, wherein the time-aligned additive recording includes at least one of additional musical audio content added to existing musical audio content or additional non-musical audio content that adds to or replaces existing non-musical content.

8. The method of claim 1, further comprising, prior to creation of the time-aligned additive recording, communicating with a collaborator network or marketplace for establishing the connection between the digital audio workstation of the first user and the computing device of the second user.

9. The method of claim 1, wherein one or more of the first watermarks and the second watermarks are either or both (i) inaudible and (ii) removable after each additive recording.

10. A computer program product comprising computer executable code embodied in a non-transitory computer readable medium that, when executing on one or more computing devices, performs the steps of:
providing control over first audio content at a digital audio workstation of a first user;
establishing a connection, over a data network, between the digital audio workstation of the first user and a computing device of a second user;
prior to and in-between individual additive recordings, inserting one or more first watermarks within first data configured for transmission from the digital audio workstation of the first user to the computing device of the second user, the first data corresponding to the first audio content, wherein the first audio content includes lossless audio;
transmitting the first data corresponding to the first audio content, with the one or more first watermarks, to the computing device of the second user;
detecting the one or more first watermarks at the computing device of the second user and replicating one or more watermarks in second audio content from the second user, each of the one or more watermarks embedded within the second audio content at a temporal location corresponding to the temporal location of a first watermark embedded within the first data of the first audio content, wherein the second audio content includes lossless audio;
receiving the second audio content at the digital audio workstation of the first user with the one or more replicated watermarks;
during creation of each additive recording, facilitating time-aligned monitoring by the first user of the first audio content relative to the second audio content by, upon the first user initiating an additive recording, immediately initiating local playback of the first audio content at the digital audio workstation of the first user at a point earlier in time relative to a temporal position of the first audio content as transmitted to the second user, wherein a difference in temporal positions of the local playback and the temporal position of the first audio content as transmitted to the second user includes at least a round-trip time difference between transmission of at least one of the first watermarks within the first audio content to the second user and reception of a corresponding replicated second watermark within the second audio content at the digital audio workstation of the first user from a play/record temporal location in the digital audio workstation of the first user; and
aligning the one or more watermarks in the second audio content with corresponding first watermarks inserted within the first audio content resulting in a time-aligned additive recording comprising both the first audio content and the second audio content.

11. The computer program product of claim 10, further comprising code that, when executing on one or more computing devices, performs the step of testing latency between the digital audio workstation of the first user and the computing device of the second user to determine a worst-case latency.

12. The computer program product of claim 11, wherein testing latency is conducted when not actively conducting one or more additive recordings so that the worst-case latency is current.

13. The computer program product of claim 11, wherein one of (i) the worst-case latency and (ii) a largest time difference between a first watermark and a corresponding replicated watermark is inserted between the temporal location of the local playback and the temporal location of the first audio content as transmitted to the second user.

14. The computer program product of claim 11, further comprising code that, when executing on one or more computing devices, performs the step of establishing an earlier temporal starting location for the first user at the digital audio workstation equal to at least one of (i) the worst-case latency and (ii) a largest time difference between a first watermark and a corresponding replicated watermark to facilitate time-aligned monitoring of the first audio content and the second audio content during the additive recording.

15. The computer program product of claim 10, wherein the code is executed by a processor disposed on at least one of a computing device of the first user, the computing device of the second user, a cloud-based server, and a remote computing resource in communication with one or more of the computing device of the first user and the computing device of the second user over a data network.

16. The computer program product of claim 10, wherein the computing device of the second user includes either a standalone client application or digital audio workstation software compatible with software of the digital audio workstation of a first user.

17. The computer program product of claim 10, wherein the time-aligned additive recording includes at least one of additional musical audio content added to existing musical audio content or additional non-musical audio content that adds to or replaces existing non-musical content.

18. The computer program product of claim 10, further comprising code that, when executing on one or more computing devices, performs the step of, prior to creation of the time-aligned additive recording, communicating with a collaborator network or marketplace for establishing the connection between the digital audio workstation of the first user and the computing device of the second user.

19. The computer program product of claim 10, wherein one or more of the first watermarks and the second watermarks are either or both (i) inaudible and (ii) removable after each additive recording.

20. A method for time-aligned additive recording, the method comprising:
- providing control over first audio content at a digital audio workstation of a first user;
- establishing a connection, over a data network, between the digital audio workstation of the first user and a computing device of a second user;
- prior to and in-between individual additive recordings, inserting one or more first watermarks within first data configured for transmission from the digital audio workstation of the first user to the computing device of the second user, the first data corresponding to the first audio content;
- transmitting the first data corresponding to the first audio content, with the one or more first watermarks, to the computing device of the second user;
- detecting the one or more first watermarks at the computing device of the second user and replicating one or more watermarks in second audio content from the second user, each of the one or more watermarks embedded within the second audio content at a temporal location corresponding to the temporal location of a first watermark embedded within the first data of the first audio content;
- receiving the second audio content at the digital audio workstation of the first user with the one or more replicated watermarks;
- during creation of each additive recording, facilitating time-aligned monitoring by the first user of the first audio content relative to the second audio content by, upon the first user initiating an additive recording, facilitating time-aligned monitoring of the first audio content by the first user relative to the second user by performing one or more of:
  - immediately initiating local playback of the first audio content at the digital audio workstation of the first user at a point earlier in time relative to a temporal position of the first audio content as transmitted to the second user, such difference in temporal position resulting from subtracting at least a round-trip time difference between transmission of at least one of the first watermarks within the first audio content to the second user and reception of a corresponding replicated second watermark within the second audio content at the digital audio workstation of the first user from a play/record temporal location in the digital audio workstation of the first user,
  - applying a monitor delay equal to at least a round-trip time difference between transmission of at least one of the first watermarks within the first audio content to the second user and reception of a corresponding replicated second watermark within the second audio content at the digital audio workstation of the first user during the additive recording, and
  - adding at least a round-trip time difference between transmission of at least one of the first watermarks within the first audio content to the second user and reception of a corresponding replicated second watermark within the second audio content at the digital audio workstation to a play/record temporal location in the digital audio workstation as the temporal position of for the first audio content as transmitted to the second user; and
- aligning the one or more watermarks in the second audio content with corresponding first watermarks inserted within the first audio content resulting in a time-aligned additive recording comprising both the first audio content and the second audio content.

* * * * *